July 2, 1968 B. R. DREW 3,391,272

APPARATUS FOR DOCUMENT SORTING INCLUDING ALTERNATIVE LOGIC MEANS

Filed July 19, 1962 4 Sheets-Sheet 1

United States Patent Office 3,391,272

Patented July 2, 1968

3,391,272

APPARATUS FOR DOCUMENT SORTING INCLUDING ALTERNATIVE LOGIC MEANS

Bobby R. Drew, Richardson, Tex., assignor to Sperry Rand Corporation, New York, N.Y., a corporation of Delaware Filed July 19, 1962, Ser. No. 211,055
14 Claims. (Cl. 235—61.7)

ABSTRACT OF THE DISCLOSURE

A document sorter is provided wherein a storage register is included and circuit means are provided to store in the storage register a value which is indicative of the data unit stored at any selected digit position on the document. The storage register operates to select the stacker pocket in accordance with the value of the data stored in the register. An additional circuit means is provided which will detect the occurrence of a preselected set of data units appearing at a preselected set of digit positions on the document. In response to the operation of the additional circuit means, the value of the contents stored in the register are altered so that a unique pocket in the sorter is selected for those documents having the preselected sequence of digit values inscribed on the document.

This invention relates to document sorting operations and more particularly to combining sorting logics.

In sorting documents, coded data, such as a customer account, institution account or the like, provides an index to an intended destination of a document. For example, banking accounting methods require that checks from many banks be sorted into groups, one group for each bank represented. In many instances it has been found, because of the variation in the magnitude of business transacted in a given area, that in a given stack of mixed documents a few institutions will account for a major portion of the entire group.

Document sorting is known to be carried out based upon a digit-by-digit logic. It has been found that sorting operations are substantially simplified by superimposing upon such logic a modified sorting operation which selectively pulls out on a first pass all of the documents coded to those institutions having relatively high volume.

In accordance with the present invention there is provided a method of sorting documents wherein data bits such as digits encoded on each document are read sequentially as the document passes a reading station. For each document, a set of conditions including one distinctive condition is generated which is representative of the digit at a selected digit position on the document. A document channel leading from the reading station is selected which includes a destination singularly related to the aforesaid digit. A modifying set of conditions is produced upon the occurrence on a given document of representations of a plurality of preselected digits in a preselected sequence. The document channel is then modified as to terminate at a different destination dependent upon the appearance of the digit sequence.

In a further aspect of the invention there is provided a system utilizing decimal coded signals and binary coded signals simultaneously produced from document encoded data. Storage means responsive to one of the codes is provided for storage of the signals in that code. Also provided is a storage for signals in the other of the codes. A control system responsive to the travel of the document at a sensing station following production of the signals superimposes data of the second coded signals on the signals in the first storage means to modify the same only upon the occurrence of a certain specific data set at a specified document location. Means are then operable to assign the document for delivery to a destination dependent upon the signals in the first storage means.

For a more complete understanding of the present invention and for further objects and advantages thereof, reference may now be had to the following description taken in conjunction with the accompanying drawings in which.

The present invention provides for substantial reduction in sorting operations particularly where documents of one or more different groups comprise a substantial fraction of the total number of documents to be sorted. It further provides for immediate access to certain documents in a stack without requiring an exhaustive digit-by-digit sort. Documents of the latter groups are sensed in accordance with the present invention in dependence upon a total field. Upon the appearance of a document having a unique field, the assignments established for sorting by a digit-by-digit logic are modified. While the invention is applicable to various types of documents on which sorting data is encoded in various forms, the example employed hereinafter is based upon documents of the type employed in banking operations. Bank checks and the like are encoded in magnetic ink. Magnetic ink character recognition (MICR) systems are well-known in the art.

Figure 1:
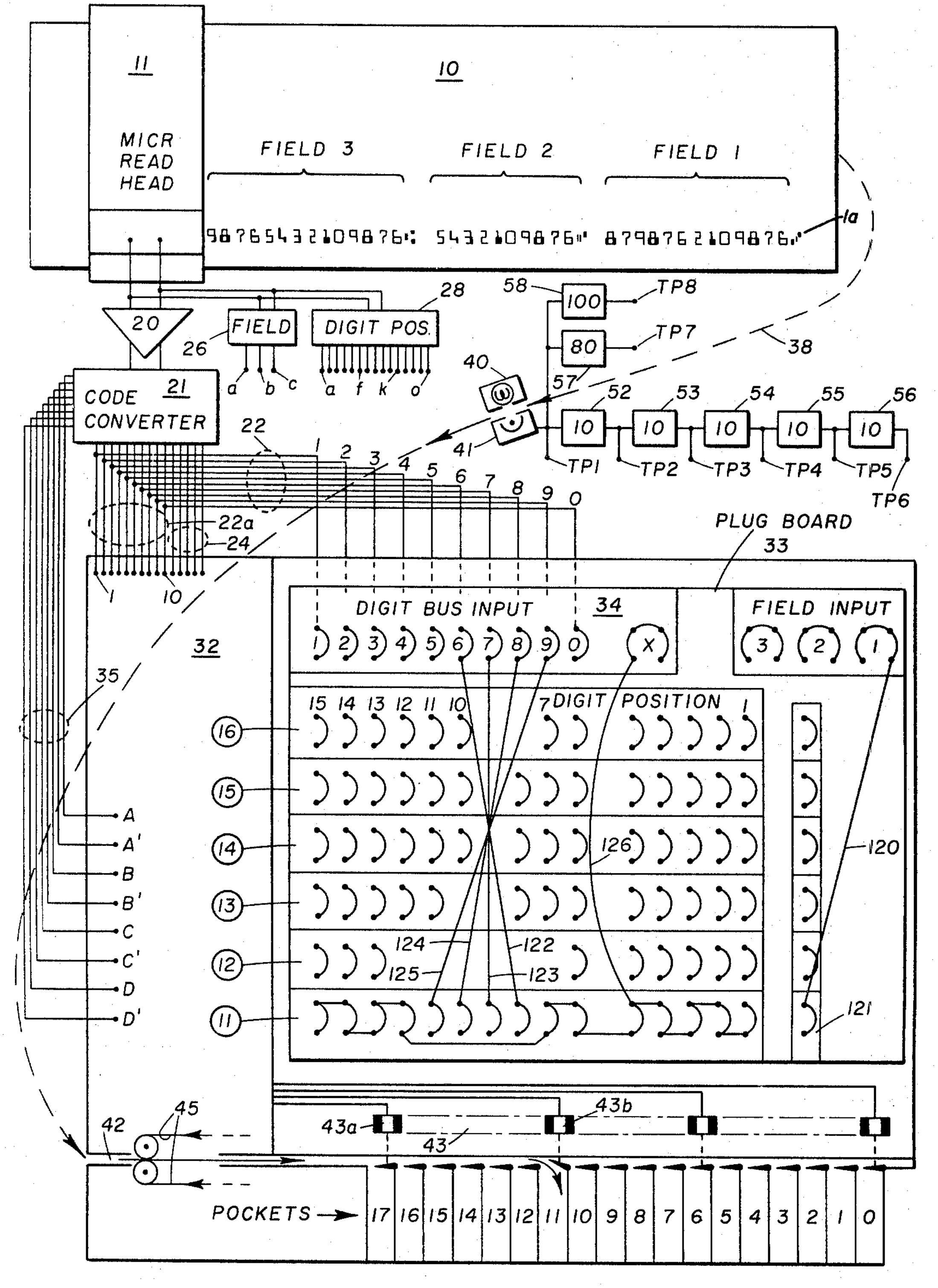
FIGURE 1 is a diagrammatic representation of a digit-field sort system.

As illustrated in FIGURE 1, document 10 has three encoded data fields. More particularly, fields 1, 2, and 3 extend along a clear band adjacent to the bottom of the document. Field 1 includes a field identification symbol 1*a* followed by 13 digits. Field 2 includes a field identification symbol followed by 10 digits. Field 3 includes a field identification symbol followed by 15 digits. The fields are located on the document 10 in alignment one with the other and in ordered sequence.

As the document 10 passes through an MICR unit, signals are produced which uniquely identify the symbols in fields 1, 2, and 3. In accordance with one mode or logic for sorting such documents, field 1 may be employed to direct the documents to any of the ten sort pockets numbered 0–9 located at the bottom of FIGURE 1. That is, a stack of intermixed documents having various combinations of digits in field 1 would be placed into the sorting system and passed sequentially through MICR 11. During the first pass, all of the documents bearing the digit "6," the first digit in field 1, may be deposited in pocket 6. All of the documents bearing the digit "0" would be deposited in the pocket 0 and likewise for the remaining digits 1–5 and 7–9. By this means, the documents would be sorted in an ordered sequence in the pockets 0 through 9 in dependence upon the first digit in field 1. The documents would then be restacked in logical order for a second pass through MICR 11. The system is then programmed manually by an operator or automatically for a sort operation based upon the digit appearing in the second position in field 1. All of the documents having a "7" in the second digit position in field 1 would be deposited in pocket 7, and so on. Similarly, by means of succeeding passes, the documents can be sorted into groups based upon a selected series of digits in any of fields 1, 2, or 3.

The digit-by-digit sort employs as many pockets as the number base employed. Regardless of base employed, a considerable simplification in sorting operation can be achieved by selecting on a first pass all of the documents which in any selected one of fields 1, 2, or 3 include all of a specified set of digits in a unique sequence. This is of utility where, for example, a particular bank does a volume of business exceeding other banks in an area. A stack of documents representing total volume or a representative fraction thereof to be sorted will include a relatively large number of checks coded to said bank. By superimposing a field sort logic on a digit-by-digit sort logic, all checks on said bank are pulled out or sorted in the first pass. The total number of documents remaining to be sorted in subsequent passes in the digit-by-digit operation will be reduced. Thus, the following description will be made clear through understanding that the sorting system senses digits of the number base 10 to utilize pockets 0–9. The pocket 10 is employed for a "0-kill" operation. Pocket 17 is for "rejects." Pockets 11–16 are employed for "field sort pull out" operations. Thus, the invention as described herein will be referred to as a digital sort with six pocket pull out logic.

Referring to FIGURE 1, signals from MICR 11 are applied by way of an amplifier 20 to a code converter 21. From the code converter 21 there extends a ten-channel digit bus 22 on which pulses selectively appear which are representative in time and position on bus 22 of the presentation to MICR 11 of the ten digits 0–9. An additional five line bus 24 carries signals representative of coded information other than the digits, such as a read-error signal or the like.

Also connected to the read unit 11 is a field signal generator 26 and a digit position counter 28. Field unit 26 generates a gate signal 30*a*, FIGURE 2, which appears on the output terminal 26*a* for the duration of the passage of field 1 through MICR 11. The same is true of terminals 26*b* and 26*c* for field 2 and field 3, respectively. Within the time occupied by gate signal 30*a* a digit gate signal will appear at terminal 28*a* of counter 28 upon passage of the first digit of field 1 through MICR 11. The digit counter 28 produces a series of pulses stepping across the output lines *a–o* in synchronism with the passage through MICR 11 of each digit position.

A branch 22*a* of ten-channel digit bus 22 is connected to a digit-by-digit sort unit 32. The converter 21 generates a signal on a given channel in the digit bus 22 only when a corresponding digit appears in MICR 11. The bus 22 extends to input terminals of a plug board 33 which has a digit bus input 34 at which the signals on the bus 22 appear.

A bus 35 extends from the converter 21 to digital code input terminals A–D′ of the unit 32. The code converter 21 applies signals to the terminals A–D′ representative in binary form of each of the digits read by MICR 11. The logic upon which the present example is based is a "10–4–4–2–1-excess 2" binary code. In the above binary code the decimal digits zero to nine are coded in a 4–4–2–1 excess 2 binary code with the bits thereof arranged so that the signals at terminals A and A′ represent the least significant bit in the binary coded system. Terminals B and B′, C and C′, D and D′ similarly represent the succeedingly more significant bits. The four pairs of terminals will accommodate signals in the form of gating signals or voltage levels adequate to indicate any digit in the series 0–9.

The transport system in the present example is operated at a speed such that a document enters MICR 11 every 50 milliseconds, processing 20 documents per second. As each document 10 leaves MICR 11 it travels along a path 38 represented by a dotted line. Each document breaks a light beam from a light source 40 along path 38. Light detected by a photocell 41 is thus interrupted to produce a control pulse. The document then continues to a gate channel 42. Channel 42 directs each document to a series of solenoid-operated deflecting gates. The document first arrives at the location of pocket 17. The gate, when actuated by a solenoid, such as solenoid 43*a*, in a solenoid bank 43 will cause the document to be deflected into pocket 17. The gate for pocket 11 is shown in an open state as controlled by relay 43*b*.

It is to be understood that a solenoid operator will be provided for each of the gates on each of the pockets 0–17. The document path 38 involves document transport means such as guided belts 45 shown adjacent to the channel 42. Such transport systems are well-known in the art and thus are illustrated diagrammatically.

Figure 2:
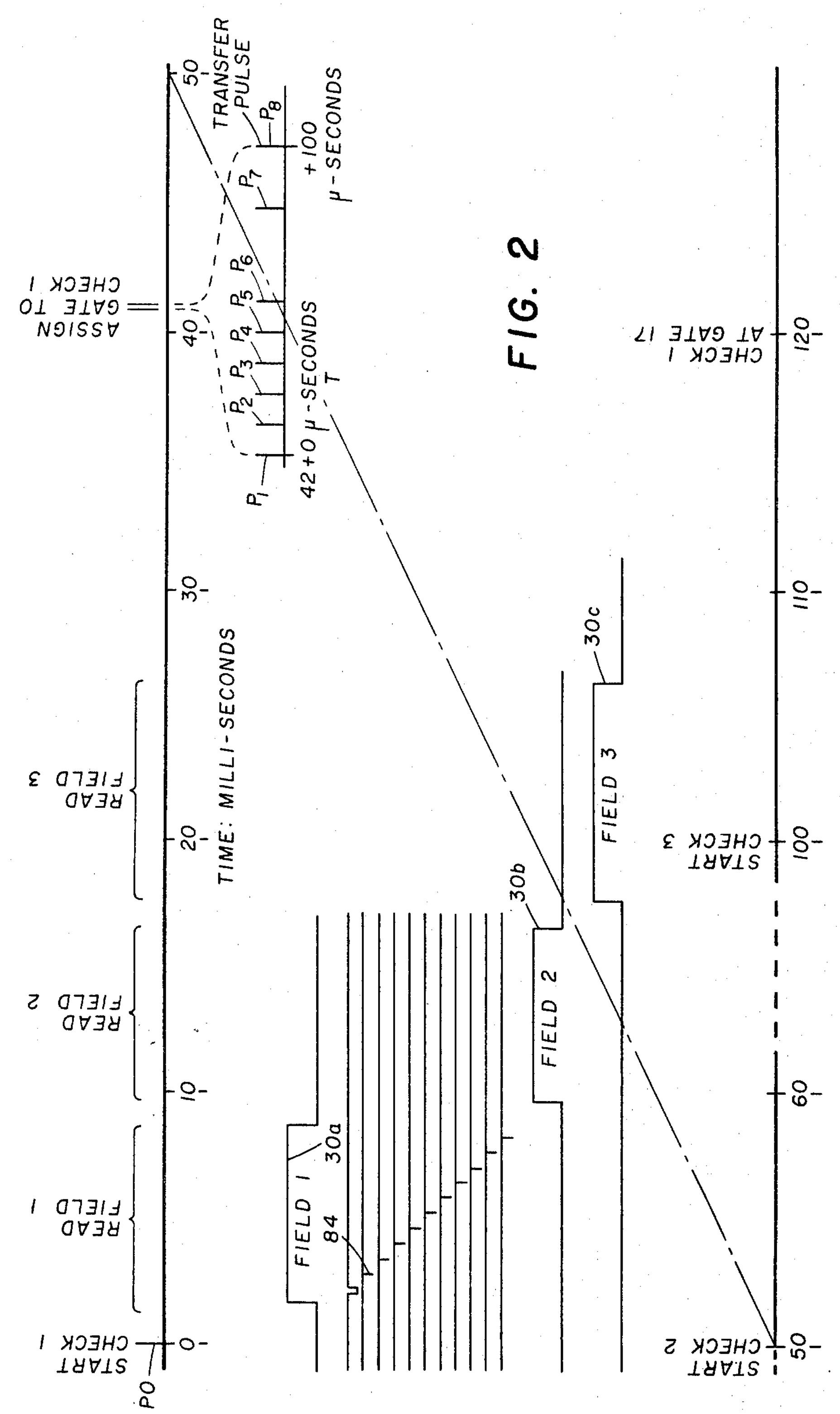
FIGURE 2 is a graph of time relationships involved in the signals employed in FIGURE 1.

The time sequence of events is illustrated in FIGURE 2. A check starts into MICR 11 at time=0. The leading edge of the check will reach the light gate 40, 41 after a time interval of 42 milliseconds. The pulse generated at the output of the photomultiplier 41 is represented in FIGURE 2 by the pulse P1. This pulse appears at the terminal TP1 of FIGURE 1. Pulse P1 is also applied to the inputs to each of the three monostable multivibrators 52, 57 and 58 whose outputs are differentiated. The first multivibrator 52 is a monostable multivibrator having a period of 10 microseconds. Thus, at its output there appears a second pulse P2 illustrated in FIGURE 2 which is delayed 10 microseconds following the pulse P1. Four monostable multivibrators 53–56 are connected in tandem to unit 52 so that the output pulses P1–P6 of FIGURE 2 will appear at terminals TP1–TP6 of FIGURE 1. The initial pulse P1 is also applied to the multivibrator 57 which has a period of 80 microseconds so that there appears at terminal TP7 a pulse P7 delayed 80 microseconds after the pulse P1. Additionally, a 100-microsecond multivibrator 58 serves to produce at the terminal TP8 of FIGURE 1 a pulse P8 which is a Transfer Pulse as indicated in FIGURE 2. Check No. 1 arrives at the pocket 17 approximately 120 milliseconds after it enters MICR 11.

Figure 3:
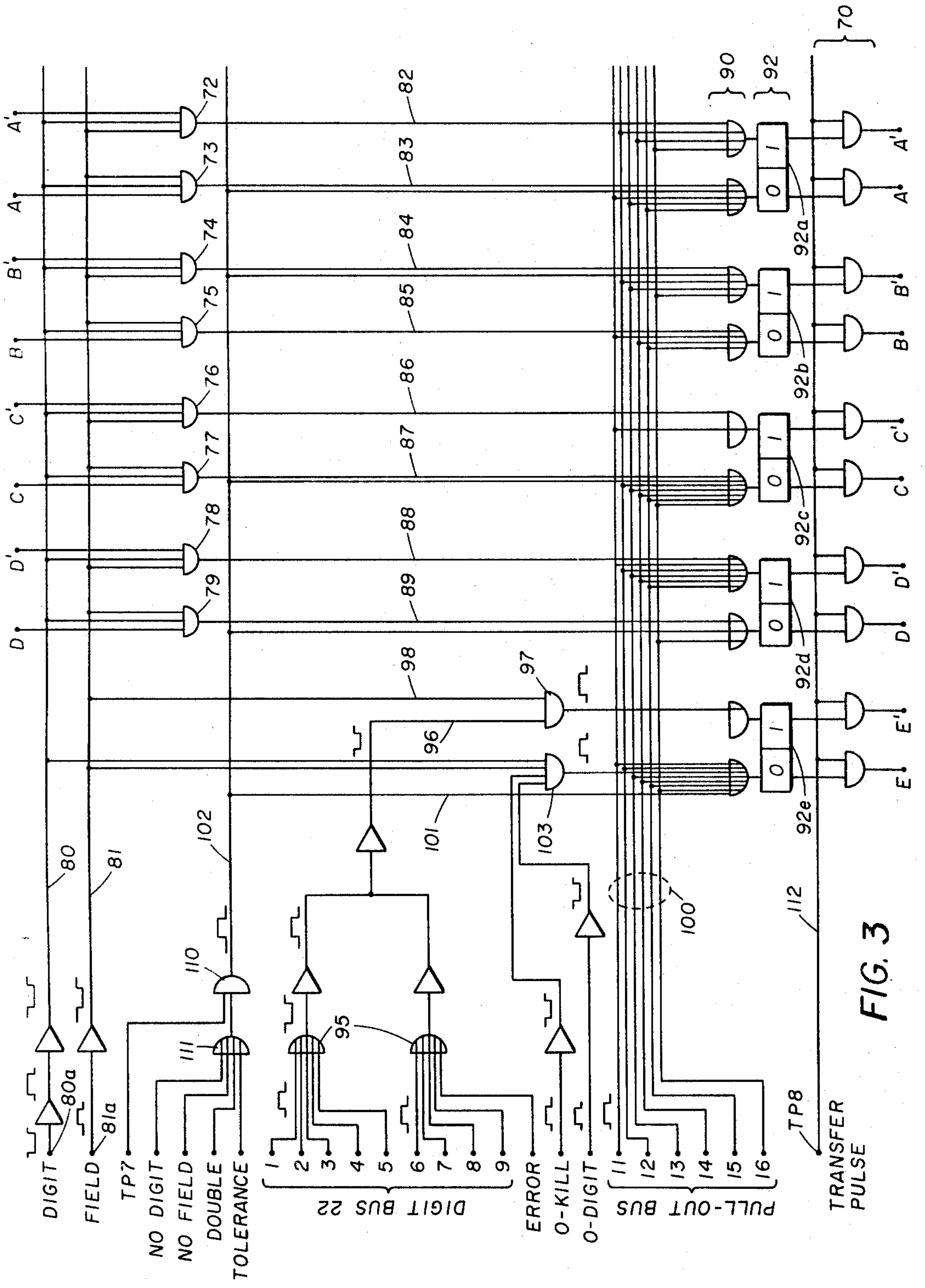
FIGURES 3 and 4 are detailed diagrams showing superposition of field sort logic on digit-by-digit sort logic.
Figure 4:
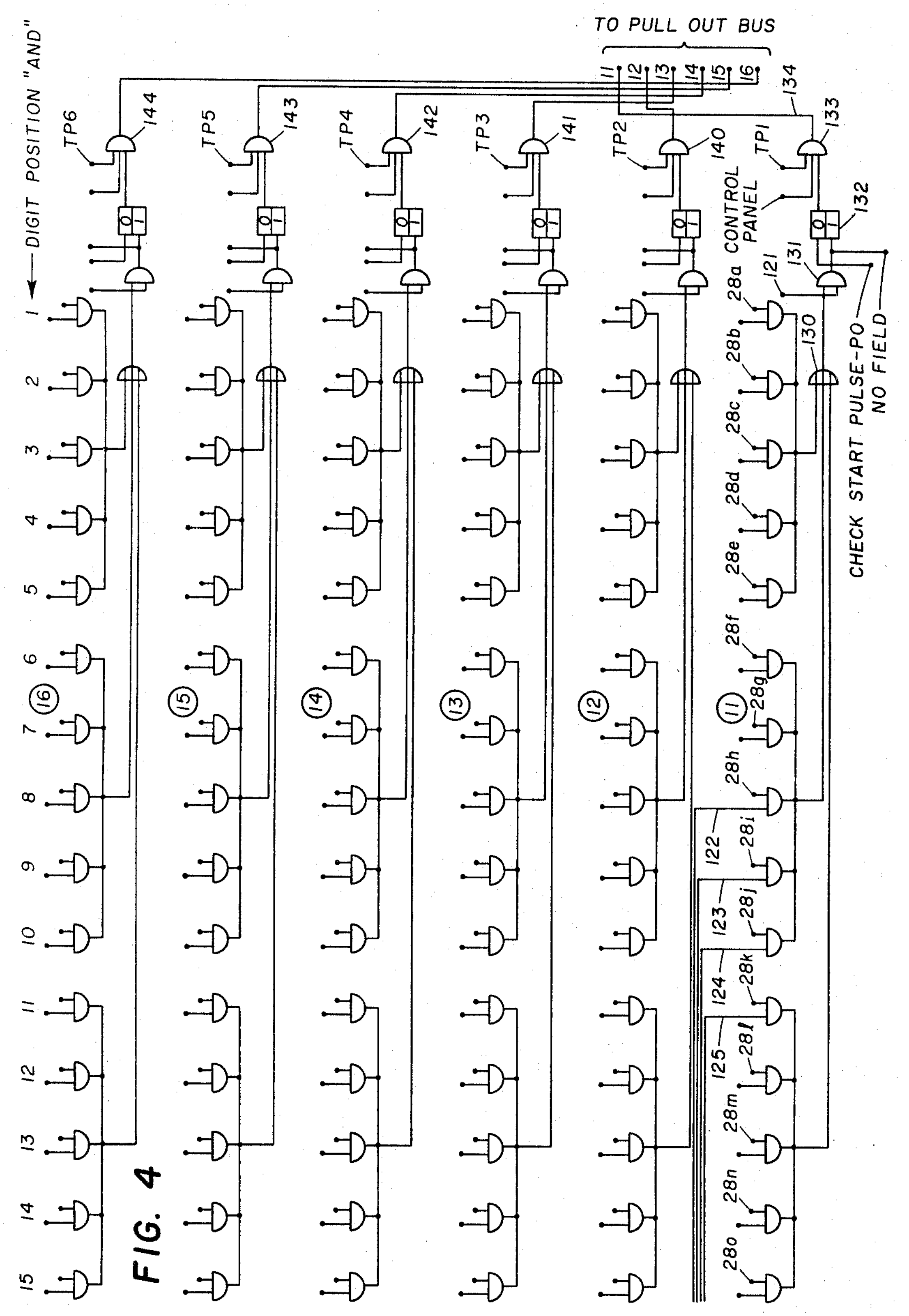

Keeping in mind the foregoing time relationships between the various control signals, reference should now be had to FIGURES 3 and 4 which illustrate, first, the assignment of a check destination in response to the digit-by-digit sort operation in the unit 32 of FIGURE 1, and, second, the modification of that assignment in dependence upon the field sort logic.

That portion of the system illustrated in FIGURE 3 utilizes the signals above described for establishing coded data at the input of gate circuit 70 of a first stage of a shift register, energizing the proper relay in relay bank 43, FIGURE 1, coincident with the arrival of a check at the pocket represented by the data.

The terminals A–D′ of FIGURE 1 also appear at the top of FIGURE 3. Terminal A′ is connected to one input of an AND gate 72. In similar manner, the terminals A–D′ are connected to AND gates 73–79. A second input to each of the gates 72–79 is connected to a digit position bus 80. A third input on each of the gates 72–79 is connected to a field bus 81.

By preselection of circuit arrangements through a control panel (not shown), an operator will select either field 1, 2, or 3 and the one of the digit positions 1–15 in that field on which the sort is to be made. For a sort based on the first digit in the field 1, the terminal 80*a* of the digit bus 80 will be connected to the terminal 28*a* of the digit position counter 28, FIGURE 1. Further, the terminal 81*a* of the field bus 81 will be connected to terminal 26*a* of the field counter 26, FIGURE 1. The field pulse 30*a*, applied to terminal 81*a* FIGURE 2, will appear on bus 81. The digit position pulse 84, FIGURE 2, is the first digit position pulse within the period of field pulse 30*a* and appears on bus 80. As the document 10 proceeds through MICR 11, digitally coded information appearing at terminals A–D′ continually changes, depending upon the particular digit being read at any instant by MICR 11. At the instant that the pulse 84 is applied to gates 72–79, coded information will be applied by way of channels 82–89 through a bank of OR gates 90 to transfer the coded data into a bank 92 of bistable multivibrators. The data thus stored in the bank 92 is representative of the digit "6" appearing at the first digit position in field 1 on document 10, FIGURE 1.

The digit bus 22 of FIGURE 1 also appears at terminals 1–9 of FIGURE 3. The latter terminals are connected to OR gates 95 and from there to input 96 of an AND gate 97. The second input 98 of the AND gate 97 is connected to the field bus 81. The output of the AND gate 97 is applied to one side of the multivibrator 92*e*. The other side of the multivibrator 92*e* is actuated in response to:

(1) a signal on any of the channels forming a pull out bus 100;
(2) a signal on channel 101 leading from a reject logic bus 102; or
(3) a signal at the output of an AND gate 103.

AND gate 103 has four inputs, one of which is connected to the digit position bus 80. The second input is connected to the field bus 81. The third input is connected to the zero digit channel of the digit bus 22. The fourth input is connected to a 0-kill control terminal manually energized from a control panel (not shown). Thus, the system can selectively be placed in a 0-kill logic.

Upon reading a zero digit at a selected digit position, the multivibrators 92*a*–92*d* will be set to code 0. Simultaneously, the multivibrator 92*e* will be set to code 10, the most significant figure in a "10–4–4–2–1–excess 2" binary code. However, if there is a digit in the sort field following the "0" as indicated by a digit pulse on any channel in the digit bus 22, the AND gate 97 will actuate the multivibrator 92*e* to change from code 10 to code 0. Absent a digit pulse following establishment of code 0 in bank 92, the 0-kill logic will direct the document to pocket 10.

A reject bus 102 is connected by way of OR gates to each of the multivibrators 92*a*–92*d*. Bus 102 is energized from an AND gate 110. One input of the AND gate 110 is derived from the terminal TP7 of FIGURE 1 and is a sampling pulse generated 80 microseconds after the document interrupts the light beam in the unit 40, 41. The second input of the AND gate 110 is an OR gate 111 to which four channels are connected. The reject bus 102 will be energized to set the multivibrators 92 to the code for the pocket 17, in the event either a digit or a field is missing, or if two checks are transported through MICR 11 at the same time, or if the check passes through MICR 11 out of tolerance adequate to permit it to be handled. Enabling signals appear on the inputs to the OR gate 111 so coded. The signals on bus 102 are related to quality of the document itself or the performance of the machine.

From the foregoing description, it will be seen that the digit-by-digit sort information is now stored in the multivibrator bank 92.

Twenty microseconds after the appearance of the reject sample pulse at terminal TP7, the transfer pulse P8, FIGURE 2, appears at terminal TP8 of a transfer bus 112. Transfer bus 112 is connected to each of ten AND gates in the bank 70. When bus 112 is enabled by pulse P8, the coded destination assignment is transferred into a suitable circuit (not shown) which serves to energize a selected one of the solenoids in solenoid bank 43 to open one of the gates leading to the pockets 0 to 17, FIGURE 1.

It will be noted in FIGURE 2 that the pulses P1–P6 appear prior to reject pulse P7 and transfer pulse P8. The pulses P1–P6 are employed in the pull out logic illustrated in FIGURE 4 to apply to the pull out bus 100 suitable signals which will modify the assignment information stored in the bank 92. This modification is dependent upon field sort logic. Broadly, the sequence is to transfer the assignment of each document into storage bank 92 based upon the digit-by-digit sort. This transfer is completed upon appearance of a digit pulse at terminal 80*a*.

In order to illustrate a pull out operation, it will be assumed that it is desired to deliver into pocket 11 of FIGURE 1 all documents on which the digits "6," "7," "8," "9," appear in field 1 at digit positions 8, 9, 10, 11, respectively.

In order to program this operation, the plug board 33 is employed. The plug board 33 has a row of digit position terminals for each of six pull out channels. The row 11 is shown at the bottom. Rows 12, 13, 14, 15, and 16 are arrayed uniformly above the bank 11. To the right of each row is the corresponding field selection section, there being six such field selection sections. The field input bus in the plug board 33 of FIGURE 1 is connected by way of a jumper 120 to the field selection section 121 of the pocket pull out system. The digit input 6 is connected by way of jumper 122 to the 8 digit position in bank 11. The digit input 7 is connected by way of jumper 123 to the 9 digit position. Digit inputs 8 and 9 are connected by way of jumpers 124 and 125 to digit position terminals 10 and 11, respectively, of the plug board. Digit position terminals 1–7 and 12–15 are connected by jumper 126 to inhibit signal source terminals X.

The digit position terminals in row 11 of FIGURE 1 are shown in the detailed circuit diagram of FIGURE 4. Also, terminals 121 of the field selection section are shown in FIGURE 4.

In FIGURE 4, fifteen AND gates are provided for each of the channels 11–16. Accordingly, field sort logic can be based upon as many as fifteen digits in a given field. The AND gates are arrayed in the order of their digit positions 1–15. It will be noted that at positions 8, 9, 10, and 11, the jumpers 122–125 are shown connected to one input of each of the corresponding AND gates. By this means there is applied to four AND gates the decimal outputs of the converter 21 as they appear in the digit bus 22 of FIGURE 1. More particularly, the decimal output of the converter 21 appears on the inputs 6, 7, 8, and 9. The input signals are positive pulses each of length of the order of 30 microseconds. The presence of such a pulse on any of the digit position AND gates inhibits the same. Pulses are applied to the second terminals 28*h*, 28*i*, 28*j*, and 28*k* from the output of the counter 28, FIGURE 1, which counts the digit positions in each field. The latter signals appear at the terminals *a*–*o* of the digit position counter 28 of FIGURE 1. Each position pulse is a five microsecond pulse of negative polarity. The five microsecond pulse is centered in time with the 30 microsecond pulse. With this circuit arrangement, each of the digit position AND gates which has applied to it a signal representative of the proper digit in the proper position will be inhibited by the positive output of the reader by the 30 microsecond pulse for a time including the period of the digit position pulse. Each gate which does not have the proper digit pulse in the proper position will be enabled at the time of the digit position pulse and therefore will produce a positive output pulse.

Output signals from the digit position AND gates are applied by way of an OR gate 130 to an AND gate 131. The second input of the AND gate 131 is derived from the field input terminal 121 of FIGURE 1. The output of the AND gate 131 is connetced to a first input of a bistable multivibrator 132. The output from the other side of the multivibrator 132 is applied to one input of an AND gate 133. A second input of the AND gate 133 is enabled by a level from the control panel setting the pocket pull out logic in operation. A third input to the AND gate 133 is connected to the terminal TP1 at the output of the light gates 40, 41 of FIGURE 1. The second input of the multivibrator 132 is energized by each check start pulse P0, FIGURE 2.

Each field symbol, therefore, sets the multivibrator 132 in its zero position. If it remains in its zero position after the appearance of the pulse P1 at terminal TP1, then there will be applied by way of the channel 134 a signal level on the pull out bus 100 of FIGURE 3 which is so connected into the bank of OR gates 90 and the storage bank 92 that the assignment previously coded into the bank 92 by the digit-by-digit sort will be changed to an assignment for pocket 11.

The output of the AND gate 131 is used to set the multivibrator 132 in its "1" state. The multivibrator 132 is set in its "1" state only if there *has not* been an exact match of the digits, digit positions, and desired field as set by the program on the plug board 33. On the other hand, if an exact match has been achieved, there will not be any output signal from any of the fifteen digit position AND gates and therefore the multivibrator 132 will remain in its zero state, the state set by each start symbol at the beginning of each field.

With the multivibrator 132 in its "1" state, the AND gate 133 is inhibited by the zero side thereof and no output will be applied to the bus 134. However, if the multivibrator 132 is in its zero state, the AND gate 133 is enabled and if the 6 pocket pull out command from the control panel is present, an output will be produced which is coded by the connections leading to the AND gates in the bank 90 of FIGURE 3 to change the pocket assignment.

The above logic is repeated for each of the remaining channels 12–16. It will be noted that in each channel a different sampling pulse is employed. In channel 11, the pulse P1 of FIGURE 2 is applied to the AND gate 133. In channel 12 the pulse P2 is applied to terminal TP2 of the AND gate 140. In channel 13, the pulse P3 is applied to channel TP3 of the AND gate 141. Similarly, in channels 14–16, the channels 142–144, respectively, are enabled by the pulses P4, P5 and P6 of FIGURE 2.

In the example given above, the field sort logic in channel 11 is based upon a selection of digits appearing in field 1 as programmed by the jumper 120 leading from the field input 1 of plug board 33 to terminal 121. It will now be understood that the plug board programming technique provides such flexibility that field logic sort may be applied to several of the fields on the document 10 at one time. For example, on plug board 33 channels 12 and 13 may be jumpered to field input 1 so that channels 12 and 13, along with channel 11, will be employed for a field sort based upon digits appearing in field 1 on document 10. The channels 14 and 15 may be jumpered to field input 2. Channels 14 and 15 will be based upon digits appearing in field 2 on document 10. Channel 16 may be jumpered to field input 3 so that the field sort will be based upon digits appearing in field 3 on the document 10.

The digit bus input provides equal flexibility in selecting connections of any desired sequence for digits appearing in the selected field.

By using the time spaced sampling pulses P1–P6 to enable the channels 11–16, the priority of pocket assignments is established. This is in case any one document satisfies two separate sets of requirements programmed in the plug board 33. Since the last of the six sampling pulses P6 is applied to the terminal TP6 in channel 16 of FIGURE 4, the pocket 16 is assigned first priority. The pockets of decreasing numerical designation are next in priority. By this means, there is incorporated in the sorter a logic function which assigns any document having a certain fifteen digit number or any specific part thereof in any particular field to any one of six particular pockets.

While the invention has been described in connection with a specific embodiment in which documents encoded in magnetic ink characters are handled at the rate of 20 per second, it is to be understood that the method and system herein provided are applicable to other types and other rates of document sorting. While a plug board has been illustrated and described as one means for programming the combined sort logics, it will be understood that other means for programming the operation may be employed while utilizing all of the desirable features of the present invention. Switching systems or pre-programmed control units as are well-known in the art will be found suitable. In any case there will be provision for immediate removal from a stack of documents any having data encoded thereon which fits the predetermined pull out program.

The foregoing illustration has been based upon the hypothesis that it is desirable to pull out large account constituents of a stack of mixed documents. Further utility of the invention will be illustrated in its application to the problem of removing from a stack of documents a single document such as a check from a stack of checks wherein it is desired to locate a check having a specific amount thereon. For example, if it is desired to pull out a check known to be in the amount of $5,110.00, the "amount" field would be programmed through the plug board bus with the digit bus input jumpered to a selected pocket with the digits 5–1–1–0–0–0. In the course of routine sorting operations, this particular check would be deposited in the selected pocket on the first pass. At the same time it would be possible to remove five other large account constituents of the batch.

From the foregoing it will be seen that there is provided a combination of digit-by-digit sort of the character described in Patent No. 2,994,428 to Daubendick with a field sort logic. Media each having a field on which control data is recorded is sensed individually and sequentially to read the control data recorded thereon. Electrical signals are generated having characteristics representative of the corresponding control data recorded on the media. A converter coupled to the sensing means receives and analyzes the electrical signals therefrom. The converter provides control data-signifying signals indicative of the identity of the control data read. Field and pulse position counters generate a set of synchronizing signals for each media, one signal being coincident with each of the electrical signals. By suitable programming, there is selected from all of the data-signifying signals a specific one of such signals provided for the control data recorded on a similarly located area on each of the media to provide a first synchronizing signal for each of the media. A primary storage is coupled through the control system to the converter and is responsive to the coincidental occurrence of the first synchronizing signal and a specific control data-signifying signal for establishing in the storage a primary sorting control signifying signal for each media. There is then provided through the use of a plug board a selection from among all of the control data-signifying signals of a set of specific data-signifying signals. A secondary storage means coupled to the converter through the plug board is responsive to coincidental occurrence of members of the set of synchronizing signals and members of the set of specific control data-signifying signals to provide a secondary sorting control signal for each of the media. A sampling pulse provides for transfer of any secondary sorting control signal to the storage to modify the primary sorting control signal.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a system for handling documents bearing data indicia at sequentially located digit positions therealong and which includes a transport mechanism for moving the documents from a supply stack to one of a plurality of stacker pockets past a reader station; a sorter comprising, first means for detecting the data value at a selected digit position on the document, a storage register, means for setting the contents of the register to indicate the value of the data so detected by the first means, second means for detecting the occurrence of a preselected sequence of data values in a preselected set of digit positions, a document detector means positioned between the reader station and the stacker pockets for detecting when a document has passed through the reader station and for producing an output signal indicative thereof, means responsive to the operation of the second means and to said output signal from said document detector for altering the contents of the storage register, and means responsive to the contents stored in said register to open a pocket in the sorter which is representative of the contents stored in said register.

2. The structure set forth in claim 1 wherein the second means includes a plug board assembly.

3. A system for sorting documents each having information symbols thereon during transit from an input station to an output station, which comprises:

(a) a reader adjacent said input station for reading said symbols serially,
(b) a code converter for generating distinctive signals each representative of one of said symbols,
(c) a symbol position counter for generating a pulse in predetermined time relation with each of said distinctive signals,
(d) a first storage means connected to said converter and said counter for successively storing the distinctive signal which is in time coincidence with a selected one of said symbols on a given document,
(e) a second storage means connected to said converter and said counter for storing a signal representative of the presence of a plurality of preselected symbols in predetermined sequence on said document,
(f) means for generating at least two pulses during travel of said document from said reader to said output station,
(g) means connected between said first storage means and said second storage means and responsive to the first of said two pulses to transfer to said first storage means any information stored in said second storage means, and
(h) means responsive to the second of said pulses for transmitting information stored in said first storage means to said output station.

4. A system for sorting documents each having information symbols thereon during transit from an input station to an output station, which comprises:

(a) a reader adjacent said input station for reading said symbols serially,
(b) a code converter for generating binary coded signals each representative of one of said symbols,
(c) a symbol position counter for generating a pulse in predetermined time relation with each of said binary signals,
(d) a first storage means connected to said converter and said counter for successively storing the binary signal corresponding in time with a selected one of said symbols on a given document,
(e) a second storage means connected to said converter and said counter for storing a signal representative of the presence of a plurality of preselected symbols in predetermined sequence on said document,
(f) means for generating at least two pulses during travel of said document from said reader to said output station,
(g) means connected between said first storage means and said second storage means and responsive to the first of said two pulses to transfer to said first storage means any information stored in said second storage means, and
(h) means responsive to the second of said pulses for transmitting information stored in said first storage means to said output station.

5. A system for sorting documents each having information symbols thereon during transit from an input station to an output station, which comprises:

(a) a reader adjacent said input station for reading said symbols serially,
(b) a code converter for generating a binary signal representative of each of said symbols,
(c) a symbol position counter for generating a pulse in predetermined time relation with each said binary signal,
(d) a first storage means connected to said converter and said counter for successively storing one binary signal corresponding in time with a selected one of said symbols on a given document,
(e) a plurality of secondary storage means connected to said converter and said counter for storing a plurality of signals each representative of the presence of a plurality of preselected symbols in predetermined sequences in said document,
(f) means for generating at least a plurality of time-spaced sampling pulses followed by a transfer pulse after said document leaves said reader and prior to arrival thereof at said output station,
(g) separate channels connected between said first storage means and each of said secondary storage means and responsive in sequence to said sampling pulses to transfer successively to said first storage means any information stored in any of said secondary storage means, and
(h) means responsive to said transfer pulse for transmitting information stored in said first storage means to said output station.

6. A system for sorting documents each having information symbols thereon during transit from an input station to an output station, which comprises:

(a) a reader adjacent said input station for reading said symbols serially,
(b) a code converter for generating a binary signal representative of each of said symbols,
(c) a symbol position counter for generating a pulse in predetermined time relation with each said binary signal,
(d) a first storage means connected to said converter and said counter for successively storing one binary signal corresponding in time with a selected one of said symbols on a given document,
(e) two secondary storage means connected to said converter and said counter for storing two signals each representative of the presence of a different plural symbol sequence on said document,
(f) means for generating at least two time-spaced sampling pulses followed by a transfer pulse during travel of said document from said reader to said output station,
(g) a first channel connecting the first of said secondary storage means to said first storage means and including means responsive to the first of said two pulses to transfer to said first storage means any information stored in the first of said secondary storage means,
(h) a second channel connecting the second of said secondary storage means to said first storage means and including means responsive to the second of said two pulses to transfer to said first storage means any information stored in the second of said secondary storage means, and
(i) means responsive to said transfer pulse for transmitting information stored in said first storage means to said output station.

7. In a system for sorting documents each having information symbols thereon, which documents pass through a reader in transit from an input station to an output station for storage in a first storage means of distinctive signals representative of the symbols at one position on each of said documents, the combination which comprises:

(a) a second storage means for storing one binary bit,
(b) means responsive to the start of each of said documents through said reader to set said second storage means in one of two states,
(c) means connected to said reader and operable in the absence from any document of any symbol in a predetermined symbol sequence to change said second storage means to a second of said states,
(d) means for generating at least two time-spaced pulses during travel of said document from said reader to said output station, (e) means responsive to the first of said two pulses for transferring the first state output from said second storage means to said first storage means to supplant said one of said distinctive signals, and (f) means responsive to the second of said pulses for transmitting information stored on said first storage means to said output station.

8. In a digit-by-digit sort system having a storage register in which there is stored sort information representative of the digit appearing at a preselected digit position in a multidigit information field on a document as it passes through a document reader, the combination which comprises:

(a) a counter having digit position channels in number equal to the number of digit positions in said field, (b) a converter having digit output channels in number corresponding with a predetermined number base, (c) a circuit including a multivibrator connected at one output to an AND circuit whose output in turn is selectively connected into said storage register in accordance with a number in said number base in excess of the number of said digit output channels, (d) means responsive to initiation of transit of said document through said system for establishing at said one output of said multivibrator a register change signal, (e) a plurality of AND gates coupled at their outputs to said multivibrator for changing the state of said multivibrator to extinguish said register change signal, (f) means for applying signals appearing on any channel selected from said digit output channels to one input of specific ones of said AND gates, (g) means for applying to the second input of the specific AND gates signals appearing on any of said digit position channels to extinguish said register change signal upon coincidence of signals on the inputs of any of said AND gates, and (h) means operable in predetermined time relation with transit of said document from said reader for applying a transfer pulse to said AND circuit to transfer to said register any register change signal at said one output of said multivibrator.

9. In a digit-by-digit sort system having a multibit storage register in which there is stored sort information representative of the digit appearing at a preselected digit position in a multidigit information field on a document as it passes through a document reader, the combination which comprises:

(a) a field sort channel having an output connected by way of a gate into said register, (b) a secondary storage having an output connected to said gate, (c) means operable in predetermined time relation with movement of said document through said reader to actuate said secondary storage for producing a register change signal on the output of said gate, (d) a converter having a plurality of digit channels for generating pulses thereon representative in time of passage through said reader of the digits in said field, (e) a digit position counter connected to said reader having output channels in number equal to the number of digit positions in said field, (f) AND gates connected to said secondary storage each having two inputs, (g) structure for selectively connecting one input of any of said AND gates to any of said digit channels and for connecting the other input of any of said AND gates to any of the counter output channels so as to extinguish said register change signal except for the appearance of a preselected digit sequence in said field, and (h) means for energizing said gate for modification of said sort information in dependence upon the presence of a register change signal.

10. In a system in which there is stored in a first register a first condition representative of a single symbol in a multisymbol information field of a document passing through a reader, the combination which comprises:

(a) a second register, (b) transfer means for coupling said second register to said first register, (c) a sensing circuit for transmitting to said second register a control pulse in predetermined time relation with the initiation of transit of said document through said reader to establish a first condition in said second register, (d) multichannel input means including OR gates connected to said second register to establish therein a second condition in the absence during passage of said document through said reader of the appearance at any one of said multichannel input means of conditions representative of a plurality of preselected symbols, (e) means operable after said document leaves said reader for applying to said transfer means a transfer pulse for supplanting any condition stored in said first register with the condition stored in said second register, and (f) means operable after appearance of said transfer pulse for enabling transmission of the condition then stored in said first register.

11. Apparatus for sorting media each having a field on which control data is recorded, said apparatus comprising:

(a) means for sensing said media individually in sequence to read the control data recorded on said field to generate electrical signals having characteristics representative of the corresponding control data recorded on said field of said media, (b) analyzing means coupled to the sensing means for receiving said electrical signals and for providing in response thereto control data-signifying signals indicative of the identity of the control data read, (c) means for generating a set of synchronizing signals for each of said media, one of said synchronizing signals being coincident with each of said electrical signals, (d) means for selecting from among all of said control data-signifying signals a specific control data-signifying signal provided for the control data recorded on a similarly located area of each of said media to provide a first selected synchronizing signal for each of said media, (e) means coupled to said analyzing means and responsive to coincidental occurrence of said first synchronizing signal and specific control data-signifying signal to provide a primary sorting control signifying signal for each of said media, (f) means for storing said primary sorting control signifying signal, (g) means for selecting from among all of said control data-signifying signals a set of specific control data-signifying signals provided for the control data recorded on similarly located areas of each of said media to provide a subset of synchronizing signals for each of said media, (h) means coupled to said analyzing means and responsive to coincidental occurrences of members of said subset of synchronizing signals and said set of said specific control data-signifying signals to provide a secondary sorting control signal for each of said media, (i) means responsive to transit of each of said media from the sensing means for generating a transfer signal, and (j) means responsive to said transfer signal for modifying said primary sorting control signifying signal in dependence upon said secondary sorting control signal.

12. Apparatus for sorting media each having a field on which control data is recorded, said apparatus comprising:

(a) means for sensing said media individually in sequence to read the control data recorded in said field to generate electrical signals having characteristics representative of the corresponding control data recorded in said field of said media.

(b) analyzing means coupled to the sensing means for receiving said electrical signals and for providing in response thereto control data-signifying signals indicative of the identity of the control data read, (c) means for generating a set of synchronizing signals for each of said media, one of said synchronizing signals being coincident with each of said electrical signals, (d) means for selecting from among all of said control data-signifying signals a specific control data-signifying signal provided for the control data recorded on a similarly located area of each of said media to provide a first selected synchronizing signal for each of said media, (e) means coupled to said analyzing means and responsive to coincidental occurrence of said first synchronizing signal and specific control data-signifying signal to provide a primary sorting control signifying signal for each of said media, (f) means for storing said primary sorting control signifying signal, (g) a plug board for selecting from among all of said control data-signifying signals a set of specific control data-signifying signals provided for the control data recorded on similarly located areas of each of said media to provide a subset of synchronizing signals for each of said media, (h) means coupled through said plug board to said analyzing means and responsive to coincidental occurrences of members of said subset of synchronizing signals and said set of said specific control data-signifying signals to provide a secondary sorting control signal for each of said media, (i) means responsive to transit of each of said media from the sensing means for generating a transfer signal, and (j) means responsive to said transfer signal for modifying said primary sorting control signifying signal in dependence upon said secondary sorting control signal.

13. In an apparatus for sorting media each having a field on which control data is recorded and which includes means for sensing said media individually in sequence to read the control data recorded in said field and to generate electrical signals having characteristics representative of the corresponding control data recorded in said field on said media and wherein there is established a primary sorting control signal for each of said media, the combination which comprises:

(a) analyzing means coupled to the sensing means for receiving electrical signals and for providing in response thereto control data-signifying signals indicative of the identity of the control data read, (b) means for generating a set of synchronizing signals for each of said media, one of said synchronizing signals being coincident with each of said electrical signals, (c) means for selecting from among all of said control data-signifying signals a set of specific control data-signifying signals provided for the control data recorded on similarly located areas of each of said media to provide a subset of synchronizing signals for each of said media, (d) means coupled to said analyzing means and responsive to coincidental occurrences of members of said subset of synchronizing signals and said set of specific control data-signifying signals to provide a secondary sorting control signal for each of said media, (e) means responsive to transit of each of said media from the sensing means for generating a transfer signal, and (f) means responsive to said transfer signal for modifying said primary sorting control signal in dependence upon said secondary sorting control signal.

14. In an apparatus for sorting media each having a field on which control data is recorded and which includes means for sensing said media individually in sequence to read the control data recorded in said field and to generate electrical signals having characteristics representative of the corresponding control data recorded in said field on said media and wherein there is established a primary sorting control signal for each of said media, the combination which comprises:

(a) analyzing means coupled to the sensing means for receiving electrical signals and for providing in response thereto control data-signifying signals indicative of the identity of the control data read, (b) means for generating a set of synchronizing signals for each of said media, one of said synchronizing signals being coincident with each of said electrical signals, (c) means for selecting from among all of said control data-signifying signals a plurality of sets of specific control data-signifying signals provided for the control data recorded on similarly located areas of each of said media to provide a plurality of subsets of synchronizing signals for each of said media, (d) means coupled to said analyzing means and responsive to coincidental occurrences of members of said subsets of synchronizing signals and said sets of specific control data-signifying signals to provide a plurality of secondary sorting control signals for each of said media, (e) means responsive to transit of each of said media from the sensing means for generating a train of transfer signals, and (f) means responsive to said transfer signals for sequentially modifying said primary sorting control signal in dependence upon each of said secondary sorting control signals.

References Cited

UNITED STATES PATENTS

| | | | |
|---|---|---|---|
| 2,359,630 | 10/1944 | Dickinson et al. | 235—61.7 XR |
| 3,067,874 | 12/1962 | Rigg | 209—111.5 |
| 3,023,399 | 2/1962 | Dickinson | 340—149 |
| 2,994,428 | 8/1961 | Daubendick | 209—111.5 |

MAYNARD R. WILBUR, *Primary Examiner.*

R. COUNCIL T. J. SLOYAN, *Assistant Examiner.*